July 7, 1953 — J. E. McLAUGHLIN — 2,644,353
CABLE SHEATHING
Filed Jan. 8, 1949 — 3 Sheets-Sheet 1
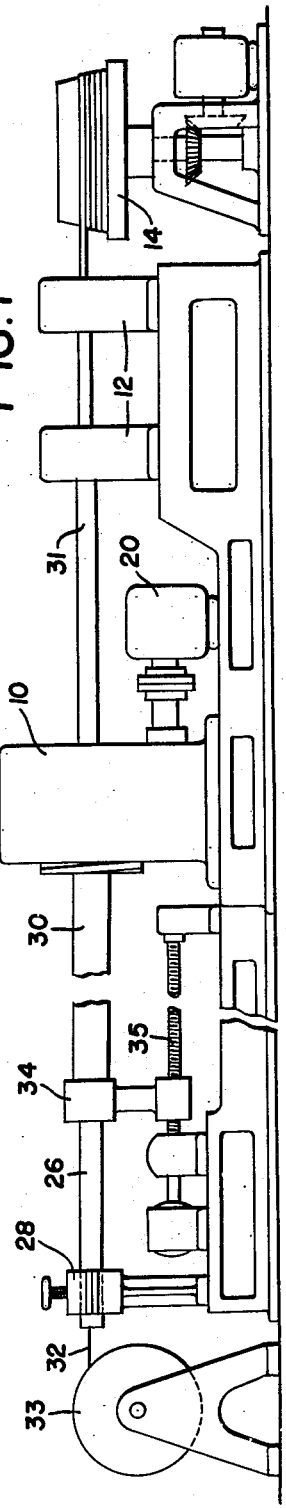
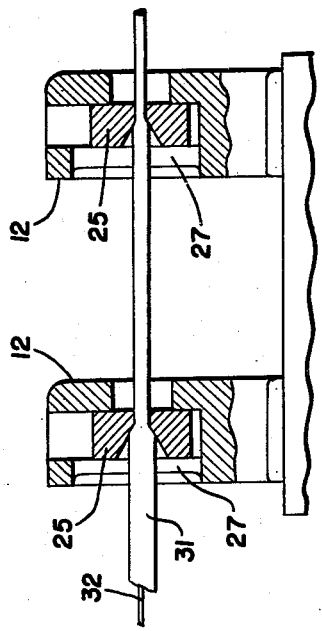
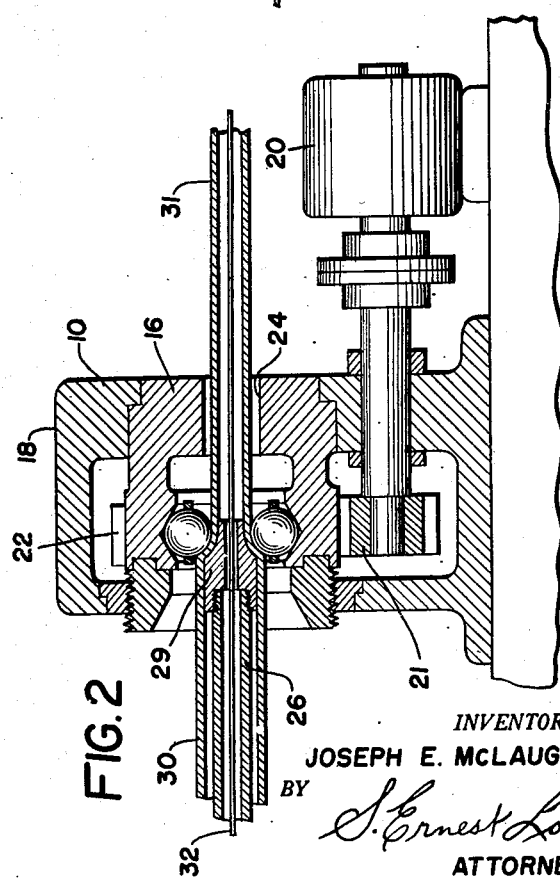
INVENTOR.
JOSEPH E. McLAUGHLIN
BY S. Ernest Low.
ATTORNEY.

July 7, 1953 J. E. McLAUGHLIN 2,644,353
CABLE SHEATHING
Filed Jan. 8, 1949 3 Sheets-Sheet 2

INVENTOR.
JOSEPH E. McLAUGHLIN
BY
J. Ernest Low
ATTORNEY

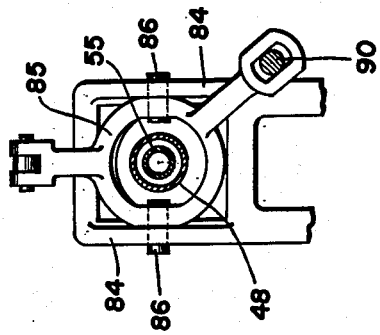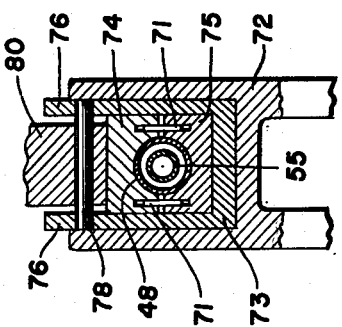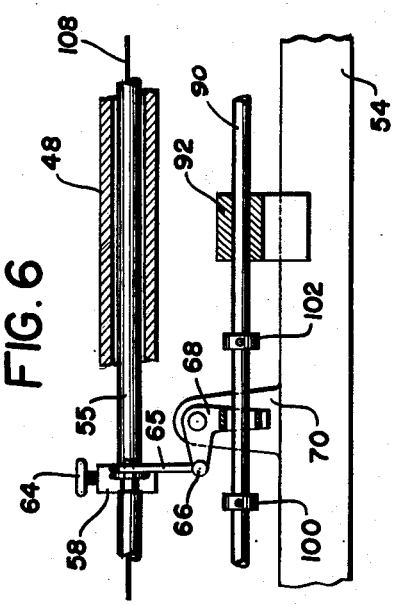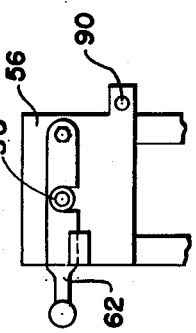

Patented July 7, 1953

2,644,353

UNITED STATES PATENT OFFICE 2,644,353

CABLE SHEATHING

Joseph E. McLaughlin, Pottsville, Pa., assignor to Aluminum Company of America, Pittsburgh, Pa., a corporation of Pennsylvania Application January 8, 1949, Serial No. 69,895

2 Claims. (Cl. 80—4)

This invention relates in general to the fabrication of sheathed cable, and is more particularly concerned with the production of metallically sheathed, insulated cable. A specific example of the invention is its adaptation to the manufacture of aluminum or aluminum alloy sheathed, paper insulated telephone cable as a substitute for presently employed lead sheathed telephone cable.

Numerous attempts have been made to substitute other metals and alloys for the lead and lead alloys in sheathed cables. The lead, or lead alloy, sheathed cables are produced by extruding the metal sheathing directly onto the cable to be sheathed. This practice has been considered satisfactory because of the fact that the lead, and numerous alloys thereof, such as lead alloys containing antimony, calcium and other alloying elements, singly and in combination, can be extruded at temperatures below the temperatures at which normally employed insulation would be damaged as by charring.

The present invention is directed to equipment which eliminates the necessity of employing extrusion or melting temperatures in the sheathing metal or alloy, and the invention may be termed a cold working process in that no external heat is required, nor does the sheathing material reach a temperature, during its working and application to an insulated cable, that is injurious to the cable or its insulation.

It is an object of the invention to provide an apparatus for sheathing cable in relatively long lengths without high temperature injury to the cable and/or its insulation.

It is another object of the invention to provide an apparatus for the continuous production of metallically sheathed, insulated cable.

Other objects and advantages will present themselves to those skilled in this art following consideration of the specification and drawings, in which:

Fig. 1 represents a mechanism in side elevation suitable for reducing and sinking tubular sheathing on cable;

Fig. 2 represents a fragmentary sectional elevation, to enlarged scale, through the reducing head or mill of the mechanism of Fig. 1;

Fig. 3 represents a fragmentary sectional elevation, to enlarged scale, through the sinking dies of the mechanism of Fig. 1;

Fig. 6 represents a fragmentary sectional elevation, to enlarged scale, through a portion of the left-hand end of the mechanism of Fig. 4;

Fig. 7 represents a fragmentary end elevational view taken in the direction of the arrows 7—7 on Fig. 5;

Fig. 8 represents a sectional elevation taken along the plane 8—8 on Fig. 5;

Fig. 9 represents a fragmentary end elevational view, to enlarged scale, as viewed from the left end of Fig. 4; and Fig. 10 represents an enlarged sectional view of the end of the mandrel employed in the alternative mechanism.

Figure 4:
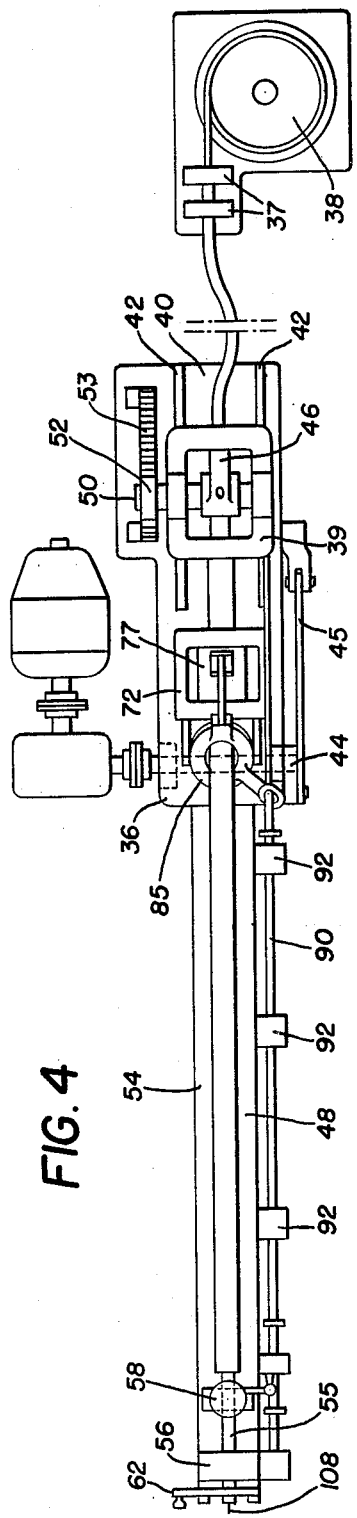
Fig. 4 represents an alternative mechanism in plan view suitable for reducing and sinking tubular sheathing on cable.

In general, the invention is concerned with an apparatus capable of reducing a metallic, thick-walled tubular bloom, within which a cable to be sheathed is loosely supported. The equipment selected for performing the reduction, should of necessity avoid introduction of any relative rotational movement greater than 360° between the tubular bloom and the interior cable that would cause the cable to twist on itself or become kinked within the bloom. The bloom is reduced in wall thickness and inside diameter with attendant increase in length. The reduction step may be continuous or intermittent, and the reduced bloom, together with its loosely supported interior cable, is thereafter subjected to at least one sinking operation to bring the reduced bloom or tubular sheath down into tight conforming contact with the interior cable. No appreciable relative movement, rotational or lineal, should exist between the reduced tubular sheathing and interior cable during the final sinking operation which places the sheathing in tight clamping contact on the cable. Otherwise, the cable and/or its insulation would be exposed to elongation, breakage or partial breakage, which would interfere with, or interrupt, the continuity of the electrical circuit through the finished product.

The drawings illustrate suitable apparatus for practicing the invention. In Figs. 1 through 3 a rotary ball type reducing mill 10 is arranged in tandem with one or more sinking dies 12 and a power-driven bull block 14. The rotary ball reducing mill 10 includes one or more ball supporting dies 16 rotatably mounted in a stationary housing 18, the die or dies 16 being power-driven by means of a suitable electric motor 20, gear connected through motor pinion 21 and gear 22, formed or otherwise attached to the exterior periphery of each die 16.

The sinking dies 12 are preferably secured in axial alignment with the discharge throat 24 of the rotary reducing mill 10, replaceable die elements or inserts 25 being supported within each sinking die 12. Several sinking die inserts may be supported within a single housing, as distinguished from the one or more separate sinking dies 12. In either case, the die inserts 25 are preferably vertically movable within guides 27 to permit axial alignment and direct pull on the sheathed cable during build-up of the same on the bull block 14.

A tubular or hollow mandrel rod 26, having an enlarged tubular mandrel nose or tip 29 formed integral or otherwise attached thereto, is secured at its rear end within a stationary clamp member 28 and extends forwardly through a seamless tubular bloom 30 into position within the rotary ball die or dies 16, where the mandrel tip 29 cooperates therewith to control the interior diameter of the reduced tubular sheathing member 31 discharged from the rotary ball reducing mill 10. Cable 32 to be sheathed is supplied from any suitable source, such as a free running reel 33, and is loosely supported within the hollow mandrel rod 26, mandrel tip 29 and reduced tubular sheathing member 31, the reduced sheathing and cable being suitably connected or attached at their forward ends to provide simultaneous advance of the reduced sheathing 31 and cable 32 through the rotary ball reducing mill 10.

The initial sheathing material or bloom 30 is positively urged or fed to the right, as viewed in Fig. 1, by means of a pusher head 34, which may engage the end of the bloom 30 or clamp on the exterior surface of the same. The pusher head 34 is axially translated through the medium of a power-driven lead screw 35.

In the preferred practice of the invention, with the equipment thus far described, the following operating steps are performed; (1) the tubular, thick-walled bloom 30 is positioned with its forward or leading end adjacent the reducing mill 10; (2) the tubular mandrel rod 26, and its attached mandrel tip 29, are introduced through the pusher head 34 and bloom 30; (3) the mandrel rod 26 and bloom 30 are advanced to position the forward end of the bloom and the mandrel nose or tip 29 in cooperative relationship within the rotary ball die or dies 16, in which position the opposite end or rearward portion of the mandrel rod 26 is clamped against axial or rotational movement in the clamp 28, and the pusher head 34 is brought into position to engage the rear end of the bloom 30; (4) the cable 32 to be sheathed is threaded through the mandrel rod 26 and mandrel tip 29 to provide a short length, say two feet, of the same in advance of the reducing mill 10; (5) the mill 10 and pusher head 34 are actuated to provide a short length, say one foot, of reduced tubular sheathing 31, after which the mill and pusher head are interrupted and the forward end of cable 32 positively attached to the forward reduced end of the tubular sheathing 31; (6) the mill 10 and pusher head 34 are again actuated to provide an additional length of reduced sheathing 31 in sufficient length to reach the bull block 14, after which the mill and pusher head are again interrupted; (7) a sufficient length of the discharged, reduced sheathing 31, with its interior cable 32 loosely supported therein, is swaged down and pointed, in any well known swaging mechanism, and the forward end thereof threaded through the sinking dies 12, where positive attachment is made to the bull block 14; (8) the bull block 14, mill 10 and pusher head 34 are power actuated in proper timed relationship to perform uninterrupted reduction on the bloom 30 and sinking of the reduced and elongated tubular sheathing 31 on the interior cable 32.

It will be understood that simultaneous operation of the pusher head 34, reducing mill 10 and bull block 14 will perform an initial bloom reducing operation followed by a final sinking operation of the reduced tubular sheathing material 31 onto the interior cable 32. The power drives for the feed screw 35, reducing mill 10 and bull block 14 are properly coordinated to provide a continuous process for the production of a sheathed cable. It is also to be observed and understood that the bloom 30, its reduced tubular extension 31 and the interior cable 32, although entirely devoid of relative rotational movement, are subjected to relative axial movement through the reducing die or dies 16 and sinking dies 12, exclusive of the sinking die 12 adjacent or closest to the bull block 14. The last-mentioned sinking die 12 performs the actual physical clamping of the tubular sheathing entering this die onto the cable 32 and hence there can be no appreciable relative movement between the sheathing and cable within the die during this final sinking operation. It should be understood that the final die sinking operation may produce a slight elongation of the outer skin or surface of the external tubular sheathing. It is significant, however, that there be no relative axial movement between the interior cable and surrounding sheath in the immediate vicinity of the interior surface of the sheathing that is brought into clamping contact with the cable or its insulation. Any sinking performed by the preceding dies 12 merely serves to reduce the sheathing with attendant elongation of the same without causing physical clamping contact on the interior cable.

The operation of the sheathing equipment thus far described is devoid or free from relative rotational movement between the sheathing material and interior cable. The operation of the equipment is likewise devoid and free from appreciable relative axial movement between the cable and sheathing material in the final sinking die, particularly in the zone defined by the interior surface of the tubular sheath in clamping contact with the interior cable. Otherwise, relative axial movement between the interior cable and its exterior sheathing during the final sinking pass would react to set up tensile forces that would be susceptible of rupturing the cable and/or its insulation.

Figure 5:
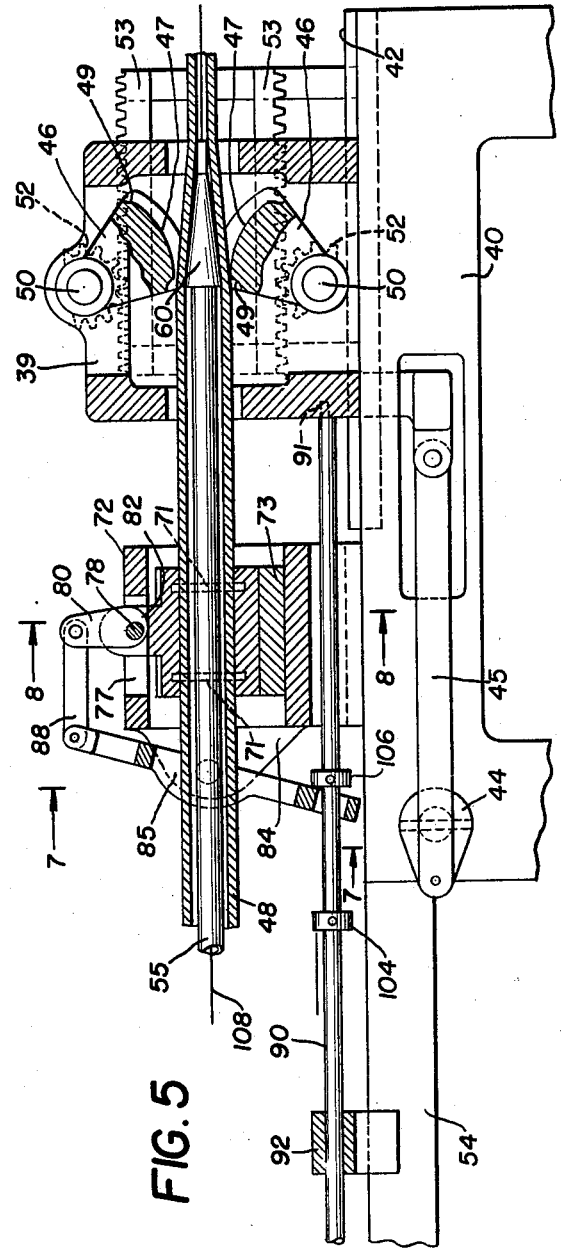
Fig. 5 represents a fragmentary sectional elevation, to enlarged scale, through the positive feeding and reducing instrumentalities of the mechanism of Fig. 4.

On reference to Figs. 4 through 10 a modified or alternative form of cable sheathing apparatus is illustrated. In this form of apparatus the actual reducing step is performed in an intermittent bloom reducer of the general type described in United States Patent 1,810,886 to George E. Neubert, patented June 16, 1931. Except for the substitution of an intermittent bloom reducer, the net result of the operation of the alternative equipment of the invention is similar to that previously described in connection with Figs. 1 through 3.

The alternative form of apparatus comprises a bloom or tube reducing mechanism 36 in tandem with one or more sinking or drawing dies 37 and a power-driven bull block 38. The tube reducer comprises a saddle member or casting 39 slidably supported upon a base casting 40 through the medium of suitable key connections 42. The saddle 39 is power reciprocated on the base 40 through the medium of a motor-driven crank 44 and connecting rod 45 interconnecting the crank and saddle.

Sector shaped swaging or reducing members 46 are supported within the saddle 39 and cooperate to form a reduction pass for a tubular bloom 48 positively fed thereto. The swaging elements 46 are secured on oscillatably journalled shafts 50, the outboard ends of which carry gear sectors 52 secured thereto in engagement with racks 53 rigidly secured to the main base casting 40. It will be observed that reciprocation of saddle member 39 will result in positive rocking oscillation of swaging elements 46. The main casting 40 is provided with an extending frame 54 which serves to support a tubular mandrel rod 55, mandrel rod clamping head 56 and mandrel rod indexing head 58. The mandrel rod 55 is provided with an integral or positively attached tapered tubular nose section 60, and extends rearwardly where it is releasably clamped against axial movement by means of a hinged mandrel rod engaging latch 62 supported on the clamp 56. Immediately in front of the clamp 56 is the mandrel rod indexing head 58. This head, in its simplest form, comprises a crank member secured to the exterior surface of the mandrel rod, as by a threaded clamping screw 64. The crank is attached through the medium of a connecting rod 65 and universal coupling 66 to one arm of a bell crank 68 pivotally secured to a bracket 70 attached to the framework 54. If desired, the indexing head 58 may be clamped on the tubular bloom 48 and perform its prescribed function, as hereinafter described.

A positive bloom feeding device is located adjacent the saddle 39. This feeding device comprises a box-like frame or housing 72 secured to the frame 40. Slidable within the housing 72 is a channel shaped housing member 73 in which are mounted upper and lower bloom engaging chucks 74 and 75, respectively. The channel shaped housing 73 is provided with upwardly extending lugs or ears 76 which project through an aperture 77 in the top wall of housing 72. The lugs 76 serve to support a pivot pin 78 upon which is oscillatably mounted in link 80 having a cam surface 82 eccentric to the pivot pin 78.

The housing 72 is equipped with brackets or integrally formed spaced lugs 84 between which an actuating yoke 85 is pivotally supported upon pivot pins 86. The yoke 85 is pin-connected by means of a link 88 at its upper end to the aforedescribed link member 80. The lower end of yoke 85 embraces an operating rod member 90.

The operating rod 90 has threaded connection at 91 to the saddle 39 and extends rearwardly therefrom through suitable supports or brackets 92 on the frame 54 where it is slidably supported at its rear end within the mandrel rod clamping head or bracket 56. The rod 90 is embraced by a downwardly extending leg of the aforementioned bell crank 68 and collars 100, 102, and 104, 106 are adjustably mounted and secured on the rod 90 on either side of its passage through the bell crank 68 and yoke member 85, the purpose of which will be hereinafter described.

In the present embodiment of the invention a tubular bloom, serving as the material from which the exterior cable sheathing is fabricated, is intermittently reduced in increments of its length and is sunk onto the cable to be sheathed in a continuous sinking operation. The bloom reducer 36 operates in a manner to intermittently and positively feed the starting bloom 48 in relatively small increments into position to be reduced downwardly and forwardly (to the right as viewed in Figs. 4 and 5) along the tapered nose 60 of the tubular mandrel rod 55 by means of forward reciprocation of the saddle 39 and its supported tube swaging elements 46.

In the practice of the invention with the equipment illustrated in Figs. 4 through 10, the relatively thick-walled bloom 48 is fed over the tubular mandrel rod 55 and projected through the clamping chucks 74 and 75 into position to be reduced by the swaging elements 46 in cooperation with the tapered mandrel nose 60. Forward reciprocation of the saddle 39, and its supported swagers 46, serves to reduce the bloom 48 to elongate the same forwardly beyond the end of the tapered nose 60.

The working faces of the swaging elements 46 are formed with tapered grooves 47 which are relieved at 49 out of contact with the bloom 48 before and after its reduction. The forward or working stroke of the saddle 39 carries with it the oscillatable swagers 46 forwardly or towards the right from their position viewed in Fig. 5, and causes their grooved working faces 47 to squeeze and roll an increment of the bloom 48 down the tapered mandrel nose 60 into seized gripping relationship therewith during a reduction and forward elongation of the bloom 48. When the saddle 39 and swagers 46 approach their most forwardly position, at which period of travel the swagers are again out of contact with the bloom, the collar 100 secured on the rod 90 engages the downwardly depending leg of the bell crank 68 to oscillate the same and its interconnected crank or indexing head 58, mandrel rod 55 and its attached tapered nose 60, together with its seized tubular bloom 48, through some angle such as 30°. In the event the indexing head is clamped on the bloom 48, the indexing will be performed in the same manner as described for the mandrel rod 55. The saddle 39 is thereafter reciprocated rearwardly to the left causing the grooved working faces of the swaging elements 46 to roll back up the tapered reduced bloom 48 to smooth the same and eliminate any fin that may have exuded between the working grooves 47.

The return or smoothing stroke of saddle 39 and swagers 46 also serves to disengage the reduced portion of bloom 48 from the mandrel nose 60, and towards the end of the return stroke, during which period the swaggers are out of contact with the bloom, collar 106 strikes the depending arm of yoke 85 to pivot the same about its pivots 86 in a clockwise direction. Initial movement of the yoke 85 in the direction stated causes the eccentric cam link 80 to pivot clockwise and force the upper chuck 74 downwardly to positively clamp the bloom 48 between chucks 74 and 75. The remaining rearward or right to left movement of the saddle 39 advances the slidable housing 73 and its clamped tube bloom 48 a small increment of the bloom length to the right into the position illustrated in Fig. 5, which places the saddle 39 and swagers 46 in position for a subsequent bloom reducing and elongating operation.

The collar 102 secured on the rod 90, on abutment against the depending leg of the bell crank 68, returns the indexing head 58 to its original position on the non-working (right to left) stroke of the saddle 39. Also, the collar 104, on abutment against the depending leg of yoke 85, returns the yoke and its interconnected elements, including the slide member 73 and its supported chucks 74 and 75, on the forward or working stroke of the saddle 39 at any interval following engagement of the bloom 48 by the swagers 46. Compression springs (not shown) may be provided around aligning pins 71 which project into the chucks 74 and 75. Such springs would insure separation of the chucks 74 and 75 into non-clamping relationship with respect to the bloom 48 following disengagement of the eccentric cam link 80 with the upper chuck 74 following the advance or forward movement of the saddle 39. In this same connection, compression springs (not shown) may be installed on the operating rod 90, between the depending leg of crank 68 and its cooperating collars 100 and 102, as well as between the depending leg of yoke 85 and its cooperating collars 104 and 106.

It will be seen thus far that the bloom reducer 36 performs an intermittent bloom reducing operation. In the practice of the invention, employing the equipment of Figs. 4 through 10, the bloom 48 is charged into the bloom reducer mechanism which is then set in operation to provide a relatively short length of reduced bloom. The mechanism is then interrupted to permit threading a cable 108 through the hollow mandrel rod 55 and mandrel nose 60 where positive connection or attachment of the forward end of the cable is made with the bloom 48 at its reduced end. The bloom reducer 36 is again operated to produce a sufficient length of reduced bloom to permit pointing the same and threading it through the sinking dies 37 for positive attachment to the power driven bull block 38. As in the previously described mechanism of the invention (Figs. 1 through 3) there is no appreciable relative axial movement between the interior cable and its exterior sheathing member during the final sinking operation by the sinking die nearest the drum 38. There may however be a slight elongation of the exterior portion of the reduced tubular sheathing, as distinguished from the zone defined by the internal surface brought into clamping relationship with the internal cable 108, in the final sinking die. Otherwise, the practice of the invention described in its association with the equipment of Figs. 4 through 10 is distinguished from the first described practice only in that it incorporates intermittent bloom reduction coupled with rotational indexing of the bloom between the reduction cycles. The rotational indexing of the bloom should never exceed 360° and may include angular step indexing up to 360° in total angular displacement of the bloom. In any event the bloom should be returned to its initial position after any single or series of indexing steps not exceeding 360° to insure against twisting and/or kinking of the interior cable.

It should also be observed, in view of the intermittent operation of the reducer mechanism 36, that a surplus or slack of reduced bloom and interior cable must be provided between the reducer 36 and sinking dies 37. This surplus is essential to permit uninterrupted or continuous operation of the power-driven bull block 38, to perform the sinking operation on the cable, without developing detrimental tensile forces on the cable, insulation or relatively thin-walled sheathing material.

It will be appreciated that alternative forms of mechanism have been illustrated as means for carrying out the invention. The invention is not to be limited to the specific forms of apparatus illustrated and described herein since any tandem mechanism that will reduce a relatively thick-walled bloom and subsequently supply the same to a sinking mechanism will function in a satisfactory manner to permit the practice of the invention. It is significant, however, that the bloom reducing and sinking operations be so performed and coordinated that relative rotational movement in excess of 360° between the cable sheathing and cable be eliminated at all times, and that appreciable relative axial movement between the cable sheathing and cable be avoided during the final sinking operation.

Commercial 16-pair paper-insulated telephone cable has been successfully sheathed with aluminum of 99.6% purity in accordance with the invention hereinabove described by employing 44-foot lengths of aluminum bloom, 1⅝ inch outside diameter × 0.285 inch wall, each bloom having been reduced to ¾ inch outside diameter × 0.049 inch wall and subsequently sunk onto the cable to provide minimum 500′ length coils of aluminum-sheathed telephone cable having an outside diameter of 0.455 inch and sheathing wall thickness of 0.050 inch. Sheathing bloom wall reductions up to 98 per cent, and preferably within the range 75 to 98 per cent, followed by one or more sinking operations, have been tested and proved satisfactory in the practice of the invention. It will be understood that the cold work reducing and sinking steps herein contemplated, when accompanied with the loosely supported interior cable to be sheathed, overcome the difficulties attendant the threading of cable through long lengths of tubing and following such a procedure with a single sinking operation.

Having described the invention and its mode of operation in association with alternative forms of apparatus, it is to be understood that the invention is not limited to the exact description herein given but should be interpreted in as broad a manner as is permitted by the prior art in the following appended claims.

What is claimed is:

1. Apparatus for sheathing a continuous length of cable by utilizing a relatively short tubular bloom from which the sheathing is to be fabricated, comprising cable supplying means, bloom reducing means and sinking die means placed in tandem, said bloom reducing means comprising a bloom reducing and elongating die mounted therein and capable of reducing the bloom up to 98 per cent, a hollow mandrel upon which the bloom is supported for reduction and elongation by the die and through which the cable is fed from the cable supplying means, means for advancing the bloom axially along said hollow mandrel into position to be reduced and elongated by the reducing die, said mandrel being of a final size, larger than said cable to maintain a clearance relationship between the cable and the bloom during the bloom reducing and elongating operation to allow relative movement between the cable and bloom until the subsequent die sinking operation, said sinking die means comprising a die member mounted in proximity to the bloom reducing means for sinking said reduced and elongated bloom into sheathing contact with said cable with a minimum of relative movement therebetween, and sheathed cable take up means for pulling said cable from said supply means through said hollow mandrel and conjointly with said reduced and elongated bloom through said sinking die means.

2. Apparatus for sheathing a continuous length of cable by utilizing a relatively short tubular bloom from which the sheathing is to be fabricated, comprising cable supplying means, bloom reducing means and sinking die means placed in tandem, said bloom reducing means comprising a bloom reducing and elongating die mounted therein, a hollow mandrel upon which the bloom is supported for reduction and elongation by the die and through which the cable is fed from the cable supplying means, means for advancing the bloom axially along said hollow mandrel into position to be reduced and elongated by the reducing die, said mandrel being of a final size, larger than said cable to maintain a clearance relationship between the cable and the bloom during the bloom reducing and elongating operation to allow relative movement between the cable and bloom until the subsequent die sinking operation, said sinking die means comprising a die member mounted in proximity to the bloom reducing means for sinking said reduced and elongated bloom into sheathing contact with said cable with a minimum of relative movement therebetween, and sheathed cable take up means for pulling said cable from said supply means through said hollow mandrel and conjointly with said reduced and elongated bloom through said sinking die means.

JOSEPH E. McLAUGHLIN.

References Cited in the file of this patent

UNITED STATES PATENTS

| Number | Name | Date |
| --- | --- | --- |
| 1,793,293 | Varney et al. | Feb. 17, 1931 |
| 1,810,886 | Neuberth | June 16, 1931 |
| 2,066,201 | Jack | Dec. 29, 1936 |
| 2,233,106 | McGuire | Feb. 25, 1941 |
| 2,386,119 | Jack | Oct. 2, 1945 |

FOREIGN PATENTS

| Number | Country | Date |
| --- | --- | --- |
| 23,007 | Great Britain | Oct. 29, 1908 |
| 405,993 | France | Jan. 18, 1910 |